UNITED STATES PATENT OFFICE.

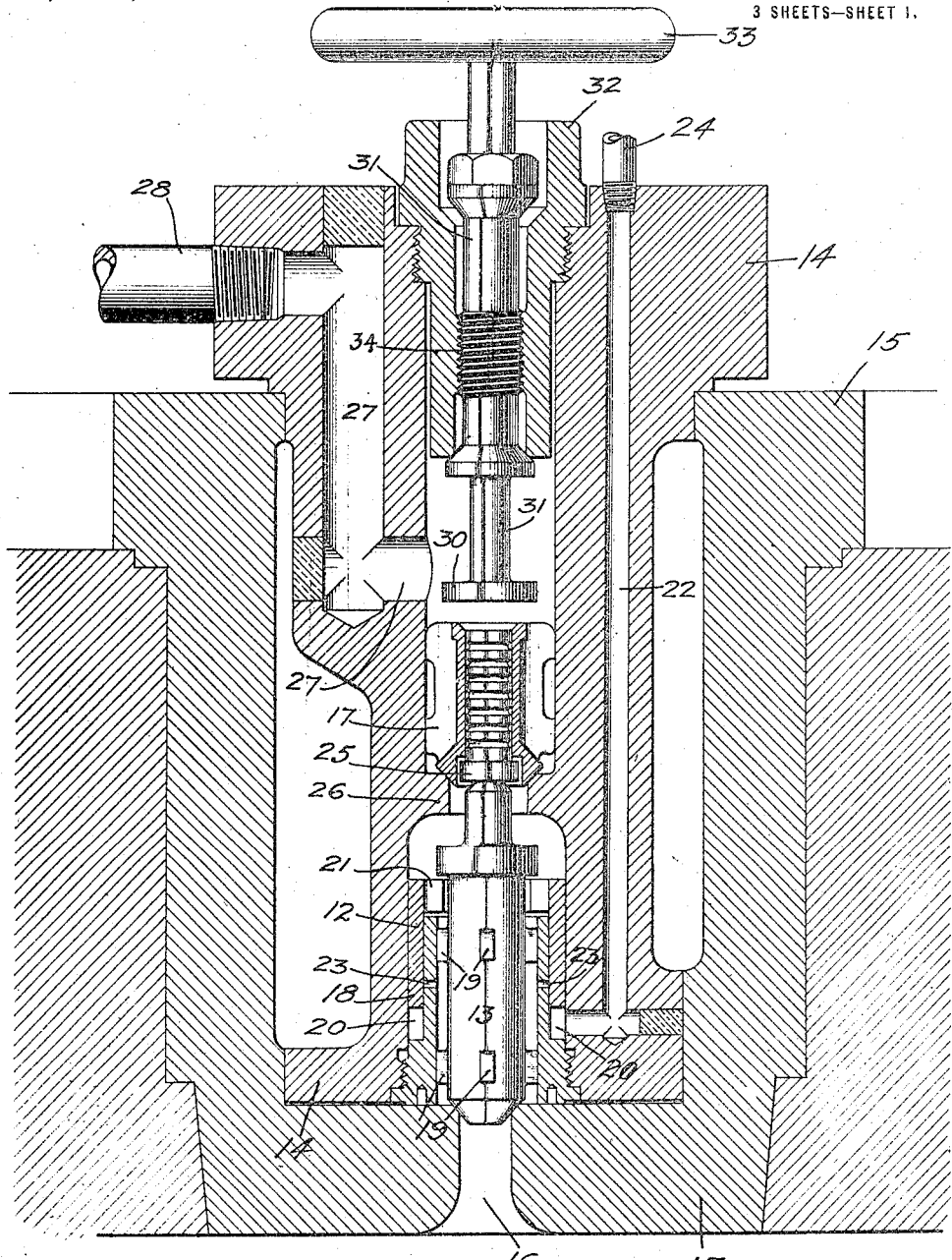

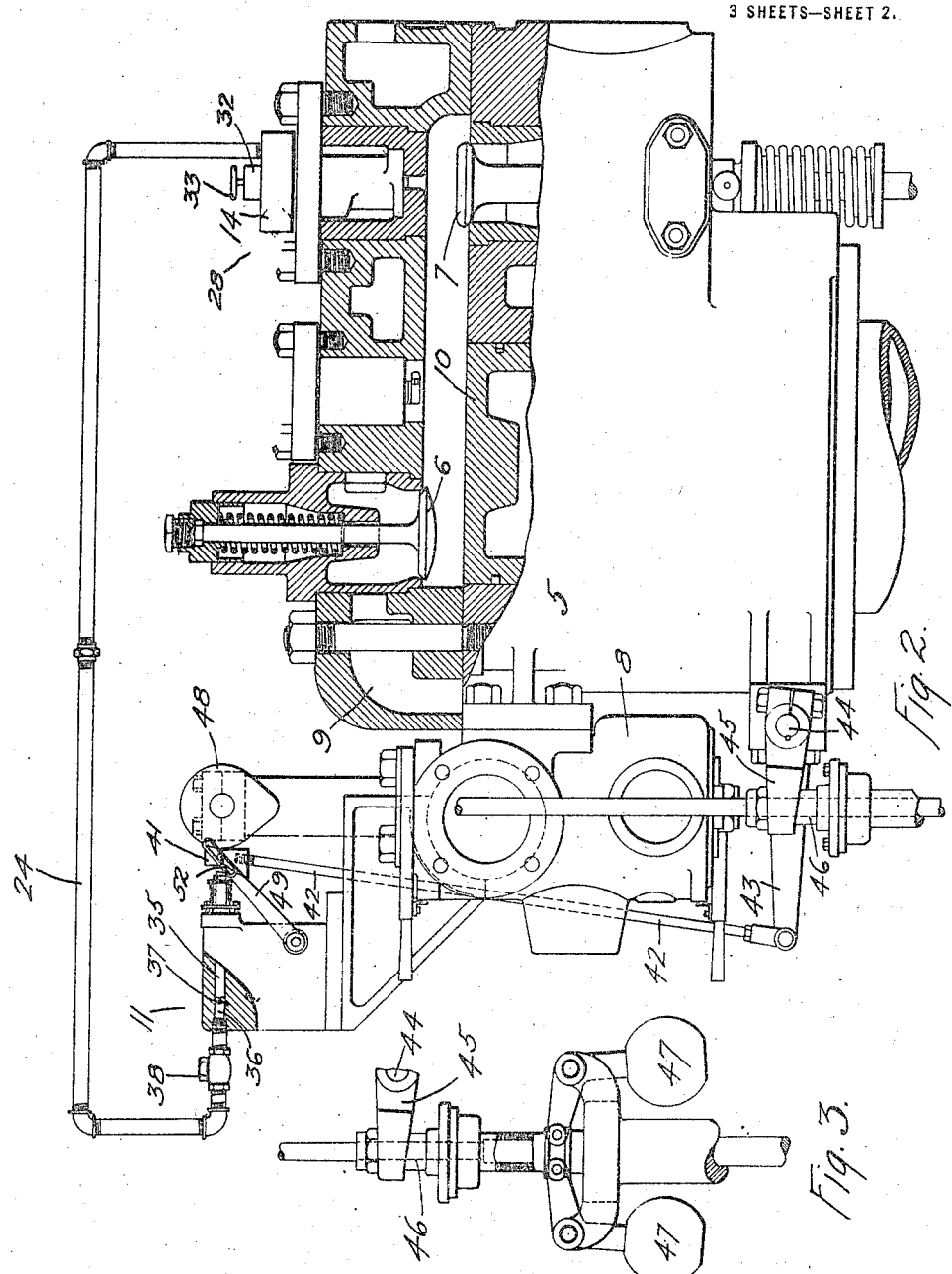

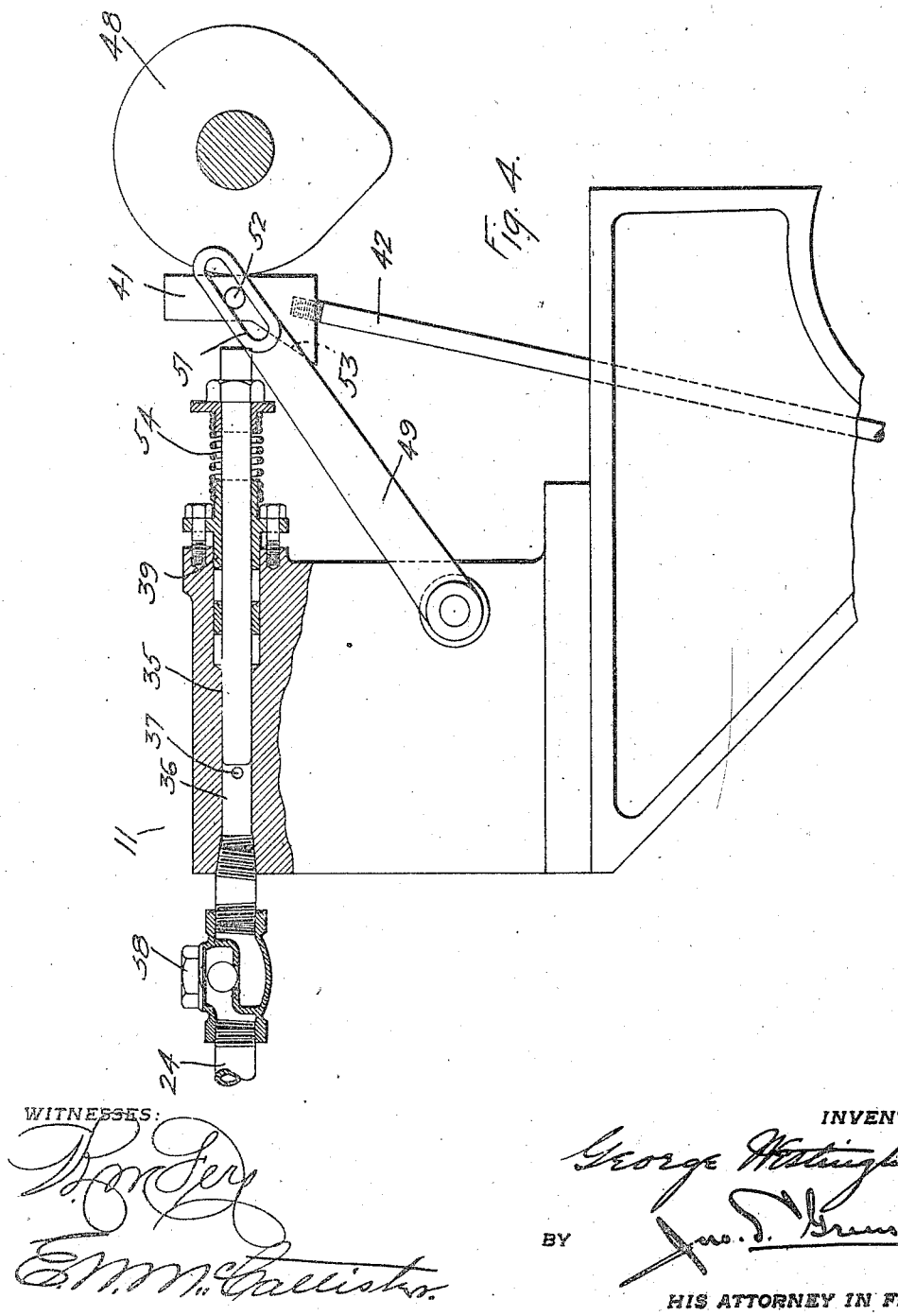

GEORGE WESTINGHOUSE, OF PITTSBURGH, PENNSYLVANIA; HENRY HERMAN WESTINGHOUSE, CHARLES A. TERRY, AND WALTER D. UPTEGRAFF EXECUTORS OF SAID GEORGE WESTINGHOUSE, DECEASED.

INTERNAL-COMBUSTION ENGINE.

1,161,095.

Specification of Letters Patent.

Patented Nov. 23, 1915.

Application filed September 28, 1910. Serial No. 584,254.

*To all whom it may concern:*

Be it known that I, GEORGE WESTINGHOUSE, a citizen of the United States, and a resident of Pittsburgh, in the county of Allegheny and State of Pennsylvania, have made a new and useful Invention in Internal-Combustion Engines, of which the following is a specification.

This invention relates to internal combustion engines, and has for an object to produce means for introducing an auxiliary charge into the engine cylinder, during the operation of the engine, for the purpose of increasing the power delivered by the engine.

A further object is to produce means for delivering compressed air to the engine during the operation of starting up and for delivering an auxiliary combustible charge to the engine cylinder during the operation of the engine.

A further object is to produce speed responsive means for delivering an auxiliary combustible charge to the engine cylinder during the operation of the engine, and for delivering compressed air to the engine cylinder during the operation of starting up the engine.

These and other objects I attain by means of the apparatus herein described, and illustrated in the drawings accompanying this application and forming a part thereof.

In the drawings: Figure 1 is a sectional view of a detail of the apparatus embodying my invention; Fig. 2 is a fragmental view, partially in section and partially in elevation, of a gas engine equipped with apparatus embodying my invention; Fig. 3 is an elevation of a governor employed with the illustrated embodiment of my invention; and Fig. 4 is a view partially in section and partially in elevation, of an oil pump and a pump operating mechanism, which constitute details of my invention.

Referring to the drawings: A portion of a gas engine cylinder 5 is shown in Fig. 2 and is provided with an inlet valve 6, an exhaust valve 7 and a mixing valve 8. A passage 9, formed partially in the engine cylinder, communicates with the mixing valve and is adapted to deliver combustible mixture to the inlet port of the gas engine. A portion of the engine piston 10 is shown in the cylinder 5.

The engine is equipped with an embodiment of my invention, which is adapted to deliver auxiliary combustible charges to the engine, when the load on the engine increases a predetermined amount, and is also adapted to deliver compressed air to the engine cylinders for the purpose of starting up the engine. The apparatus illustrated includes a governor-controlled oil pump 11 and a pressure actuated valve 12 and plunger 13, which are adapted to rise, in response to oil pressure delivered by the pump 11, and to deliver a charge of oil and compressed air to the engine cylinder. The valve and the plunger are located in a casing 14, which is shown located in an outer casing 15 and mounted on the cylinder 5. The casing 14 is substantially cylindrical and is provided with a longitudinally extending passage, which communicates at its lower end, with a port 16 provided in the casing 15, and in which the plunger 13, the valve 12 and an air-control valve 17 are located.

The port 16 of the casing 15 communicates with the interior of the engine cylinder and the plunger 13 is adapted to seat on the edge of the port 16 for the purpose of closing it. A bushing 18 is screwed into the lower end of the casing 14, and surrounds the plunger 13. Guide lugs 19 are formed on the plunger 13 and engage the inner face of the bushing 18. With this arrangement, the plunger is guided by the bushing, and an annular passage is provided between it and the bushing, through which the auxiliary charge of oil and air is delivered to the port 16. The inner end of the bushing is so constructed that an annular passage 20 is located between it and the inner peripheral face of the casing 14.

A reciprocating sleeve, located in the passage 20, constitutes the valve 12 and is provided with inwardly extending radial wings 21 adapted to engage a collar provided on the plunger 13 for the purpose of raising the plunger to open the port 16. An oil delivery passage 22 is provided in the casing 14 and communicates with the lowest portion of the passage 20 below the sleeve valve 12. Ports 23 are provided in the bushing 18 and communicate with the passage 20 and with the passage located between the plunger 13 and the bushing. The flow of oil through these ports is controlled by the valve 12. Oil pressure is periodically delivered to the passage 20 by the governor-controlled pump 11, through piping 24.

The upper end of the plunger 13 contacts with a plug 25 of the pressure control valve 17, which is arranged to seat on a shoulder 26 formed on the interior of the casing 14 above the passage 13. Air under pressure is delivered to the interior of the casing 14, above the valve 17, through a passage 27 formed in the casing and communicating with a source of air pressure through suitable piping 28. The plug 25 is provided with oil grooves for the purpose of forming an air-tight joint between it and the valve 17, and is capable of sufficient independent movement to permit the valve 17 and the plunger 13 to independently move to their seats in response to air pressure.

The valve 17 is held to its seat by the air pressure above it, and the plunger 13 is forced to its seat by the air pressure on the upper end of the plug 25. An adjustable stop 30 is located in the casing 14 and its stem 31 extends upwardly through a bushing 32 screwed into the upper end of the casing 14, and is adapted to be moved to different positions for the purpose of limiting the upward movement of the valve 17, and consequently the plunger 13 and the valve 12. The stop is provided with a hand wheel 33 and is provided with screw threads 34 which engage screw threads formed on the bushing 32.

The oil pump 11 is so arranged that it will deliver oil to the passage 22 during predetermined or heavy loads on the engine, and raise the valve 12, the plunger 13 and the valve 17, and deliver an auxiliary charge of oil and air to the engine cylinder. The oil pump consists of a plunger 35, which reciprocates in a cylindrical passage 36 communicating with the passage 22 through the piping 24. An inlet port 37 communicates with the passage 36 and with a source of oil supply (not shown) and is adapted to be covered and uncovered by the plunger 35 during its reciprocations. A check valve 38 is shown located in the piping 24 and is so arranged that it permits a flow of oil from the pump to the passage 20, but prevents a flow in the opposite direction.

One end of the plunger 35 projects out of the passage 36 through a suitable packing 39 and is adapted to be engaged by a governor-controlled and cam actuated wedge 41. The wedge 41 is mounted on the end of a rod 42, which is pivotally mounted on a governor-actuated lever 43. The lever 43 is mounted on a pin 44 on which a lever 45 is mounted. The lever 45 is actuated by a reciprocating sleeve 46 which forms a part of a fly ball governor and is actuated by the balls 47 of the governor. The wedge 41 is held in place between the plunger 35 and a cam 48 by means of pivotally mounted guide arms 49, one of which is located on each side of the wedge and is provided with a way 51, through which a pin 52, mounted on the wedge, projects. The cam 48 is driven by the engine and is adapted to reciprocate the wedge 41. The wedge is so constructed that it engages and imparts motion to the plunger 35 during predetermined or heavy loads on the engine, but reciprocates without contacting with the plunger during light loads on the engine. This is accomplished, in the apparatus illustrated, by so forming and locating the inclined face 53 of the wedge that it will engage the end of the plunger 35, when the wedge is raised, through the agency of the rod 42 and the levers 43 and 44, by the governor during heavy loads on the engine. In Figs. 2 and 4 the mechanism is shown in light load position, while in Fig. 3, the governor is shown at rest. With this arrangement, the plunger 35 is moved through the pumping stroke by the wedge 41 during heavy loads on the engine, and is returned to its initial position by means of a coiled spring 54, which surrounds the plunger and operates between a collar carried by the plunger and the stuffing box 39. It will be apparent that the travel of the plunger varies with the lift of the wedge 41.

When the piping 24 and the communicating passages are full of oil, the valve 12 will respond to each stroke of the plunger 35 and will first lift the plunger 13 off its seat and then open the ports 23 and deliver oil from the passage 20 into the passage surrounding the plunger 13. The valve 12, in lifting the plunger 13, also raises the valve 17 and thereby delivers a flow of air, from the passage 27, through the port 16 and into the engine cylinder. The air entering the port 16 must first traverse the passage between the bushing 18 and the plunger 13 and will therefore take up the oil delivered by the ports 23 and carry it into the engine cylinder. The source of air pressure communicating with the passage 27 is maintained at such a pressure that it always preponderates over the pressure in the engine cylinder. Under such conditions, the oil and air delivered to the engine cylinder through the port 16 will be intimately mixed and the oil will be in the form of spray. After the charge of oil and air has been delivered to the engine cylinder in response to a reciprocation of the plunger 35, the air pressure above the valve 17 will force the valve 17, the plunger 13 and the valve 12 to their seats and thereby cut off the delivery of the auxiliary charge to the engine cylinder.

The cam 48 may be driven by the engine in any suitable manner. It is preferably so arranged that it will so operate the pump 11, during heavy loads on the engine, that the auxiliary charge will be delivered to the engine cylinder during the first part of the firing stroke of the engine piston. With this arrangement, the charge of oil and air will be ignited by the burning gases in the engine cylinder.

It will be apparent that the apparatus illustrated may be used for all the cylinders of a multi-cylinder engine, and that its operation may be varied by varying the shape of the wedge 41 and the adjustment of the wedge with reference to the governor-actuated sleeve 46.

During the starting operation, I contemplate employing the apparatus illustrated in delivering air pressure to the engine cylinders. When the engine is at rest, the governor balls 47 occupy such positions that the wedge 41 will be moved to the operative position. During the ordinary operation of the engine, oil, as well as air, would be delivered to the engine cylinder with the wedge in this position; and to prevent such a delivery of oil during the starting operation, I provide the stop 30, which may be moved to such position that the valve 12 in rising in response to the increase of pressure in the oil passages, will be capable of lifting the plunger 13 and the valve 17, but will not be capable of opening the ports 23. As soon as the engine is up to speed, the stop 30 is raised by the hand wheel 33 so that the apparatus will be in position to operate automatically to deliver auxiliary charges of gas and air to the engine cylinder during heavy loads.

It is not necessary to limit the motion of the valve 12 by the stop 30 during the operation of starting up the engine, since oil may be introduced with the air into the engine cylinder. The mixture of oil and air will exert sufficient pressure in the engine cylinders to quickly bring the engine up to speed; and in addition to this, the mixture of oil and air will be ignited by the ignition apparatus of the engine.

During the normal operation of the engine, by proper adjustment of the wedge 41, the apparatus illustrated as an embodiment of my invention, may be used to increase the capacity of the engine from 30% to 50% by introducing the auxiliary charge, without increasing the maximum pressure obtained in the engine cylinders. This feature tends to greatly increase the economy of engines employed with widely varying loads.

It may be necessary to employ means for gradually discharging the surplus oil from the passage 20 so that the sleeve valve 12 will move to its normal position in response to the air pressure above the valve 17. This can be accomplished in various ways; but in the apparatus illustrated, I rely upon the leakage of oil around the valve 12 and through the ports 23 to permit the valve to move to its closed position. The leakage of oil is so small that it does not affect the operation or the efficiency of the apparatus.

Having thus described my invention, what I claim is:

1. The combination with an internal combustion engine having a main mixture supply valve and an exhaust valve, of means for delivering an auxiliary supply of combustible mixture to said engine, comprising an auxiliary inlet communicating with the engine cylinder, an air pressure delivery valve for delivering air under pressure to the engine through said auxiliary inlet, a liquid fuel delivery valve for delivering liquid fuel into the stream of air passing the air delivery valve, a pump for actuating said fuel delivery valve and for supplying liquid fuel thereto, means for driving the pump synchronously with the engine and a governor driven by the engine for controlling the operation of the pump.

2. The combination with an internal combustion engine having a main mixture supply valve and an exhaust valve, of means for delivering an auxiliary supply of combustible mixture to said engine, comprising an auxiliary inlet communicating with the engine cylinder, an air pressure delivery valve for delivering air under pressure to the engine through said auxiliary inlet, a liquid fuel delivery valve for delivering liquid fuel into the stream of air passing the air delivery valve, pressure creating means for actuating one or both of said last mentioned valves, and a governor driven by the engine for controlling the operation of said pressure creating means.

3. The combination with an internal combustion engine having a main mixture supply valve and an exhaust valve, of means for delivering an auxiliary supply of combustible mixture to said engine, comprising interdependent valves for delivering compressed air and liquid fuel to said engine, pressure creating means driven by the engine for actuating both of said valves, and a governor driven by the engine for controlling the operation of said means.

4. The combination with an internal combustion engine having a main mixture supply valve and an exhaust valve, of means for delivering an auxiliary supply of combustible mixture to said engine, comprising interdependent valves for delivering compressed air and liquid fuel to said engine, a liquid fuel pump for delivering fuel to one of said valves and for actuating both of said valves, and governor controlled means for controlling the operation of said pump.

5. The combination with an internal combustion engine having an exhaust valve and a main mixture supply valve, of means for delivering an auxiliary charge of combustible mixture to said engine, comprising an air pressure delivery valve, a fuel delivery valve for delivering fuel into the stream of air passing said air delivery valve and for actuating said air delivery valve, and an engine-driven governor-controlled means for actuating said fuel delivery valve.

6. The combination with an internal combustion engine, of a valve for delivering compressed air to the engine cylinder, a fuel valve for delivering fuel into the stream of air delivered by the air valve and for actuating said air valve, pressure-creating means for actuating said fuel valve and a governor driven by the engine for controlling the operation of said means.

7. The combination with an internal combustion engine, of a valve for delivering compressed air to the engine cylinder, a fuel valve for delivering fuel into the stream of air passing said air valve and for actuating said air valve, pressure-creating means for actuating said fuel valve, and an adjustable stop for checking the motion of said valves to prevent the delivery of fuel to the engine.

8. The combination with an internal combustion engine having an inlet and an exhaust valve, of means for delivering auxiliary charges of combustible mixture to said engine comprising an air delivery valve, a fuel delivery valve, and a governor-controlled oil pump for actuating both of said valves.

9. The combination with an internal combustion engine, of means for delivering an auxiliary charge to the engine cylinder, comprising a valve for delivering compressed air to the cylinder, a fuel valve surrounding the air valve for delivering fuel to the cylinder and for actuating said air valve, and a pump for delivering fuel to the fuel valve and for actuating the fuel valve.

In testimony whereof, I have hereunto subscribed my name this 23rd day of September, 1910.

GEO. WESTINGHOUSE.

Witnesses:
C. W. McGhee.
E. W. McCallister.